United States Patent [19]

Ouchi et al.

[11] Patent Number: 4,774,601
[45] Date of Patent: Sep. 27, 1988

[54] READ CHANNEL FOR MAGNETIC RECORDING

[75] Inventors: Yasuhide Ouchi, Kokubunji; Hajime Aoi, Tachikawa; Takashi Tamura, Odawara; Nobumasa Nishiyama, Hachioji, all of Japan

[73] Assignee: Hitachi, Ltd., Tokyo, Japan

[21] Appl. No.: 940,494

[22] Filed: Dec. 10, 1986

[30] Foreign Application Priority Data

Dec. 11, 1985 [JP] Japan ................. 60-276743

[51] Int. Cl.⁴ .............................................. G11B 5/09
[52] U.S. Cl. ........................................ 360/46; 360/51
[58] Field of Search ............... 360/46, 67, 51; 364/59

[56] References Cited

U.S. PATENT DOCUMENTS 4,495,529  1/1965  Gustafson .............................. 360/67

Primary Examiner—Vincent P. Canney
Attorney, Agent, or Firm—Antonelli, Terry & Wands

[57] ABSTRACT

In a read channel for magnetic recording used to reproduce information recorded on a magnetic recording medium, a signal reproduced from a magnetic head and a differentiated signal of the reproduction signal are ORed together to produce a gate signal. By using the gate signal, the information can be reproduced correctly.

7 Claims, 6 Drawing Sheets

READ CHANNEL FOR MAGNETIC RECORDING

BACKGROUND OF THE INVENTION

This invention relates to a read channel for a magnetic record in the form of digital information and more particularly to a read pulse generator capable of correct detection of data signals.

The read channel for a magnetic record is typically constructed as exemplified in FIG. 1. Thus, a signal represented by reference characters 1a and 1b (more strictly, a positive-going portion is represented by 1a and a negative-going portion is represented by 1b) is a reproduction signal from a magnetic head 1, and this reproduction signal is amplified by a pre-amplifier 2 into a signal 2a, 2b which in turn is passed through an automatic gain control (AGC) circuit 3. An output signal from the AGC circuit 3, as represented by 3a and 3b, is shaped by an equalizer 4 into a signal represented by 4a and 4b. This signal 4a, 4b is, on the one hand, differentiated by a differentiation circuit 5 to produce a signal 5a, 5b that is passed through a low-pass filter 6 to provide a differentiated signal 6a, 6b which in turn is supplied to a read pulse generator 8. On the other hand, the signal 4a, 4b branches to a low-pass filter 7 and a non-differentiation or reproduction signal 7a, 7b therefrom is also supplied to the read pulse generator 8. The read pulse generator 8 derives from pulses representative of the differentiated signal only pulse edges which correctly reflect peaks or correct data portions of the non-differentiation signal. These pulse edges are used to form a read pulse signal 8a. The read pulse signal 8a directly connects to a discriminator 10 and at the same branches to a variable frequency oscillator (VFO) 9. The VFO 9 then produces a detection window signal 9a which is supplied to the discriminator 10. By using the read pulse signal 8a and the detection window signal 9a, the discriminator 10 performs phase discrimination to form a read data signal 10a which is sent as reproduction information to a host controller.

One example of this type of read channel for magnetic record is disclosed in U.S. Pat. No. 4,081,756 to Robert Price et al. A typical example of a read pulse generator used for the read channel for magnetic recording is shown in FIG. 2 and a time chart illustrative of signal waveforms appearing in the read pulse generator is shown in FIG. 3. The differentiated signal 6a, 6b is fed to a limiter circuit 11 in order for its zero-cross points to be detected. An output pulse signal from the limiter circuit 11, as represented by 11a and 11b, may probably contain zero-cross signal pulse edges indicated at 11A in FIG. 3 which do not correspond to any correct data portion of the non-differentiation signal 7a, 7b. This is because at portions of the signal 7a, 7b where no magnetization inversion occurs, there occurs no change in magnetization and the non-differentiation signal indicative of the head reproducing signal becomes substantially zero and flattened and is differentiated to generate erroneous zero-cross signal pulse edges. To eliminate the erroneous zero-cross signal pulse edges 11A, gate signals 14a and 16a corresponding to peaks or correct data portions of the non-differentiation signal 7a, 7b are generated. Correct pulse edges of zero-cross signal representative of correct data portions can be extracted using the gate signals 14a and 16a. More specifically, a set/reset flip-flop 18 and D-type flip-flops 19 and 20 are used in such a manner that only the first pulse edge of zero-cross signal which appears immediately after each of the gate signals 14a and 16a rises can be extracted. For example, when a pulse of the gate signal 16a rises at time $t_1$, only a zero-cross signal pulse edge appearing at time $t_2$ is extracted and when a pulse of the gate signal 14a rises at time $t_3$, only a zero-cross signal pulse edge appearing at time $t_4$ is extracted. Delay lines 12, 13, 15 and 17 are used to place the waveforms in timed relationship. The pulse width can be adjusted by means of a pulse width setting circuit 27.

In the read pulse generator constructed as above, however, the amplitude of non-differentiation signal 7a, 7b occurring in a high density recording region can not extend sufficiently as indicated at 7A in FIG. 3 and is often decreased below a slice level 28 under the influence of a noise and a medium defect as indicated at 7B in FIG. 3. Consequently, a pulse 14A of the gate signal 14a corresponding to the data portion 7A can not be generated, resulting in loss of data as shown at 8A in FIG. 3.

SUMMARY OF THE INVENTION

An object of this invention is to provide a read channel for recording which can correctly reproduce information to be reproduced even under the influence of a noise and a medium defect.

To accomplish the above object, the present invention takes advantage of the fact that while the amplitude of the non-differentiation signal, from which gate signals are sliced off, can not extend sufficiently in a high density region thereby causing the conventional read pulse generator to fail to perform correct reproduction of information, the amplitude of the differentiated signal is larger in a high density recording region than in a low density recording region. Therefore gate signals are also sliced off from the differentiated signal to assure constant generation of a gate signal even in a high density recording region. In particular, according to the invention, gate signals sliced off from the non-differentiation signal as in the prior art and those sliced off from the differentiated signal are ORed together to create a set of gate signals which are used to extract a zero-cross pulse signal, thereby ensuring correct signal reproduction.

DESCRIPTION OF THE PREFERRED EMBODIMENTS

A preferred embodiment of the invention will now be described with reference to FIGS. 4 and 5.

Figure 1:
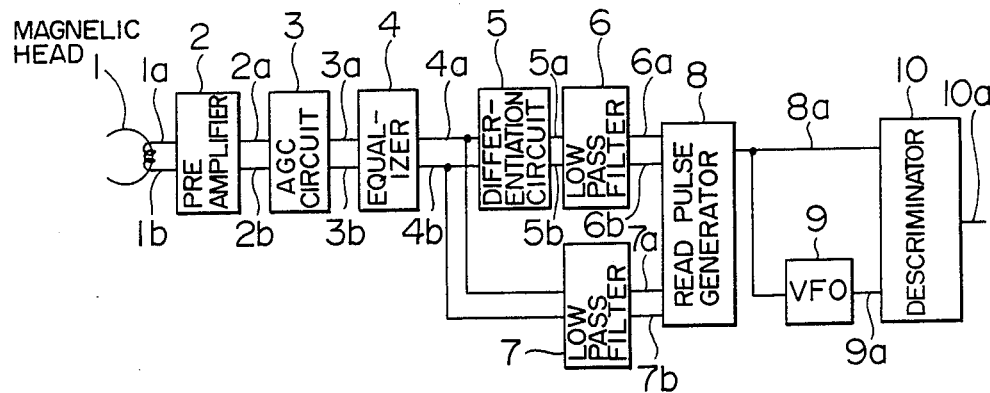
FIG. 1 is a block diagram schematically illustrating a read channel for magnetic recording to which the invention is applied.
Figure 2:
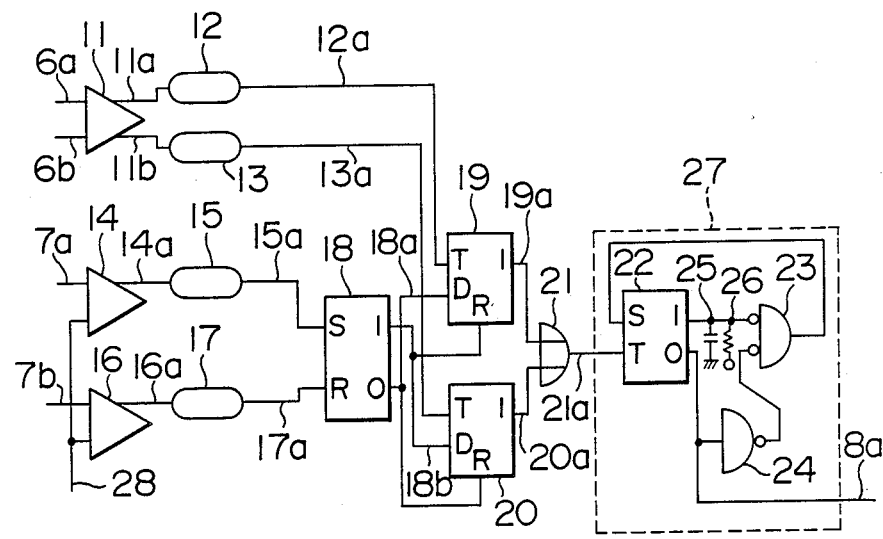
FIG. 2 is a circuit diagram showing a prior art read pulse generator.
Figure 3:
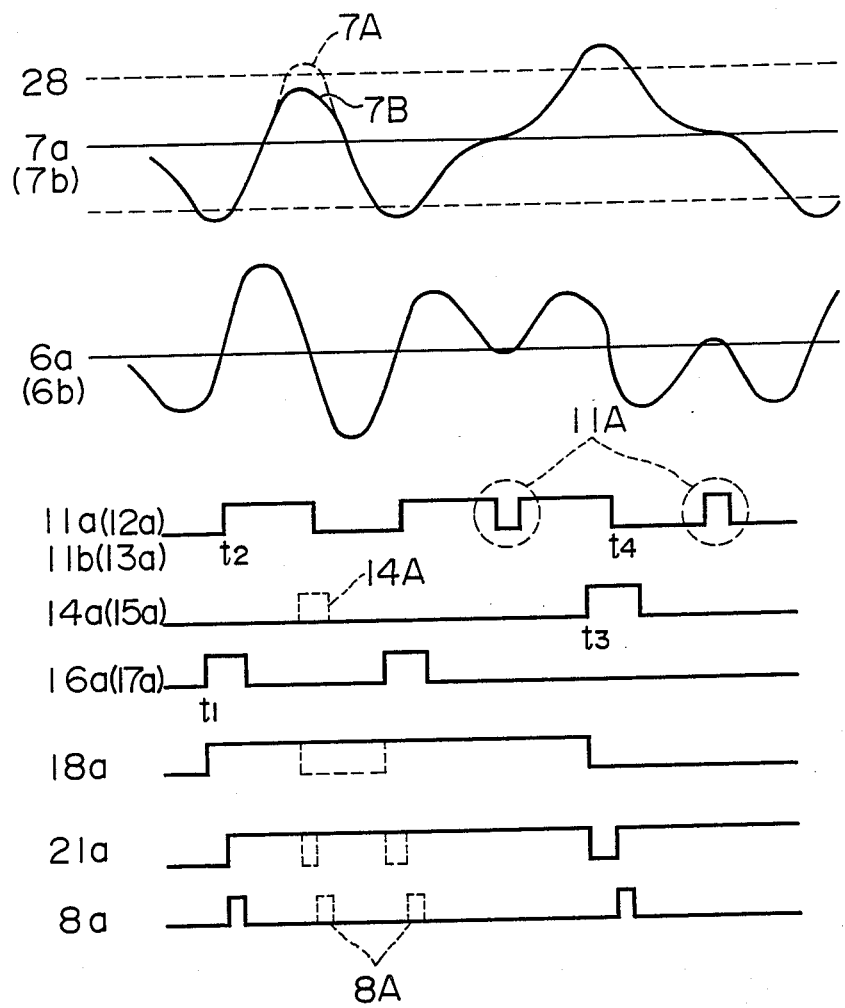
FIG. 3 is a time chart illustrative of signal waveforms appearing in the FIG. 2 read pulse generator.
Figure 4:
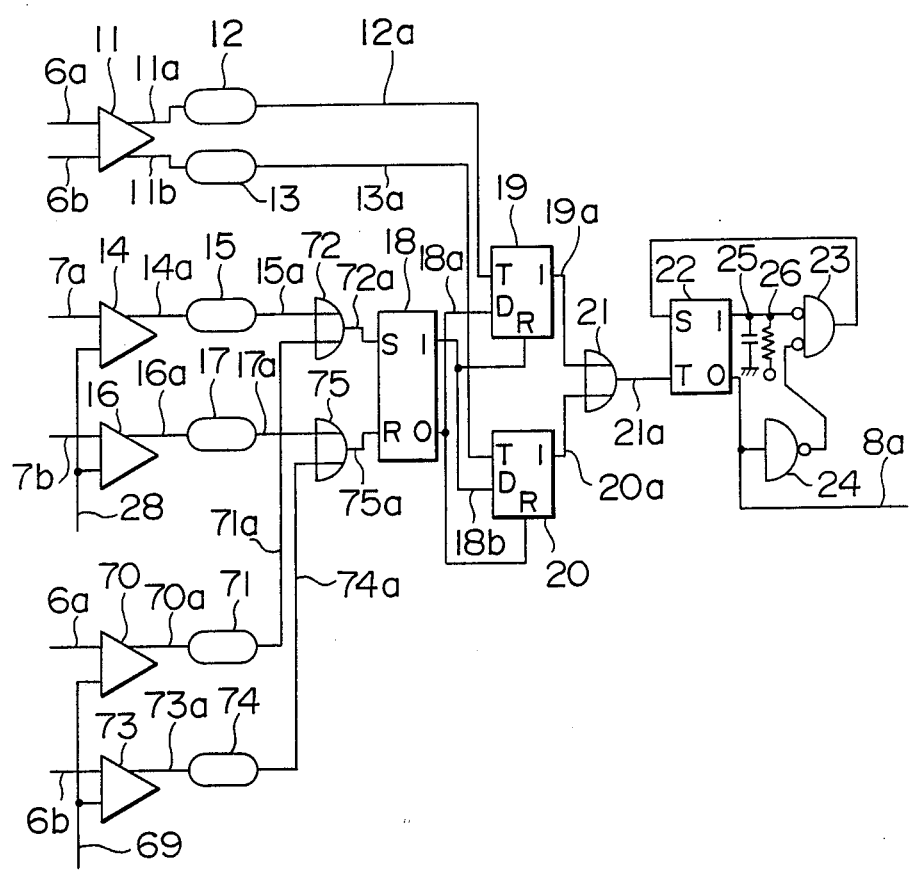
FIG. 4 is a circuit diagram showing a read pulse generator according to an embodiment of the invention.

A read pulse generator embodying the invention is illustrated in FIG. 4 and it may be typically applied as the read pulse generator 8 of the read channel for magnetic recording shown in FIG. 1. In FIG. 4, elements like those of FIG. 1 are designated by ike reference characters.

Referring to FIG. 4, the read pulse generator of this embodiment constructionally differs from the prior art in that it additionally comprises limiter circuits 70 and 73 which are supplied with a slice level 69 to slice off gate signals 70a and 73a from the differentiated signal 6a, 6b, delay lines 71 and 74 for delaying the gate signals 70a and 73a, an OR circuit 72 for ORing a delayed gate signal 71a sliced off fom the differentiated signal 6a and a delayed gate signal 15a sliced off from the non-differentiation signal 7a, and an OR circuit 75 for ORing a delayed gate signal 74a sliced off from the differentiated signal 6b and a delayed gate signal 17a sliced off from the non-differentiation signal 7b.

The operation of this read pulse generator will be described with reference to the FIG. 5 time chart illustrative of signal waveforms appearing in the generator.

Figure 5:
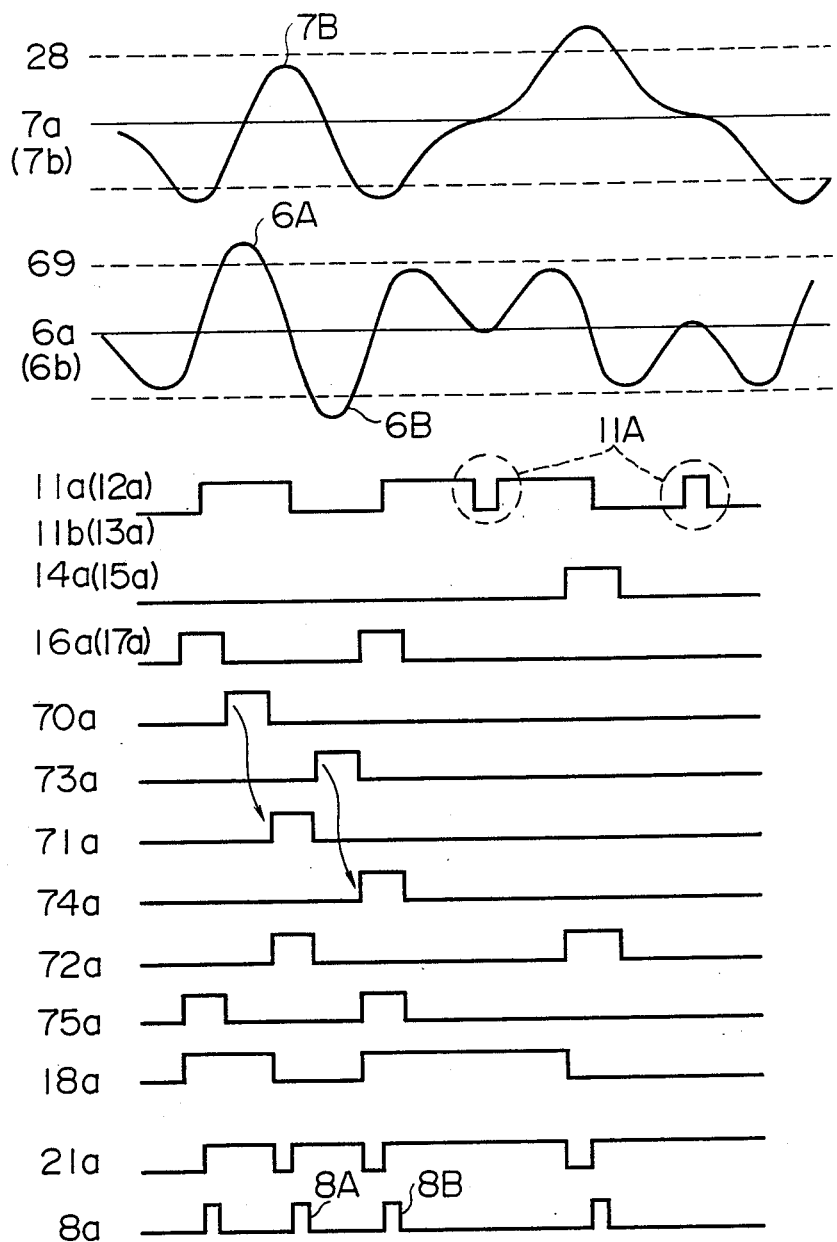
FIG. 5 is a time chart illustrative of signal waveforms appearing in the FIG. 4 read pulse generator.

If, as described previously, the amplitude of the non-differentiation signal 7a, 7b is decreased as shown at 7B in FIG. 5 under the influence of a noise and a medium defect, a pulse of the gate signal 14a corresponding to the portion 7B can not be generated in spite of the fact that the portion 7B is indicative of a correct data portion. On the contrary, the gate signal 70a sliced off from the differentiated signal 6a, 6b, especially from a positive-going portion 6a, contains a pulse reflecting a peak portion 6A of the differentiated signal. Likewise, the gate signal 73a sliced off from the differentiated signal, especially from a negative-going portion 6b thereof, contains a pulse corresponding to a peak portion 6B of the differentiated signal. The gate signals 70a and 73a are delayed through the delay lines 71 and 74 to provide the delayed gate signals 71a and 74a, and pulses of the delayed gate signals 71a and 74a are desired to be placed in timed relationship with the portion 7B and the following peak of the non-differentiation signal, respectively. For this purpose, the delay amount of the delay lines 71 and 74 is made approximately ¼ fw larger than that of the delay lines 15 and 17, where fw is the maximum recording frequency for information to be recorded on the medium. Then, the delayed gate signals 15a and 71a are ORed together by means of the OR circuit 72 to provide a correct gate signal 72a and the delayed gate signals 17a and 74a are ORed together by means of the OR circuit 75 to provide a correct gate 75a. Accordingly, a read pulse signal 8a containing a data pulse 8A corresponding to the data portion 7B of the non-differentiation signal, along with a data pulse 8B, can be correctly derived and reproduced from the delayed zero-cross pulse signal 12a, 13a by using the correct gate signals 72a and 75a. In addition, the surplus, erroneous pulse edges 11A can be removed as in the prior art generator, thereby assuring correct reproduction of information.

Figure 6:
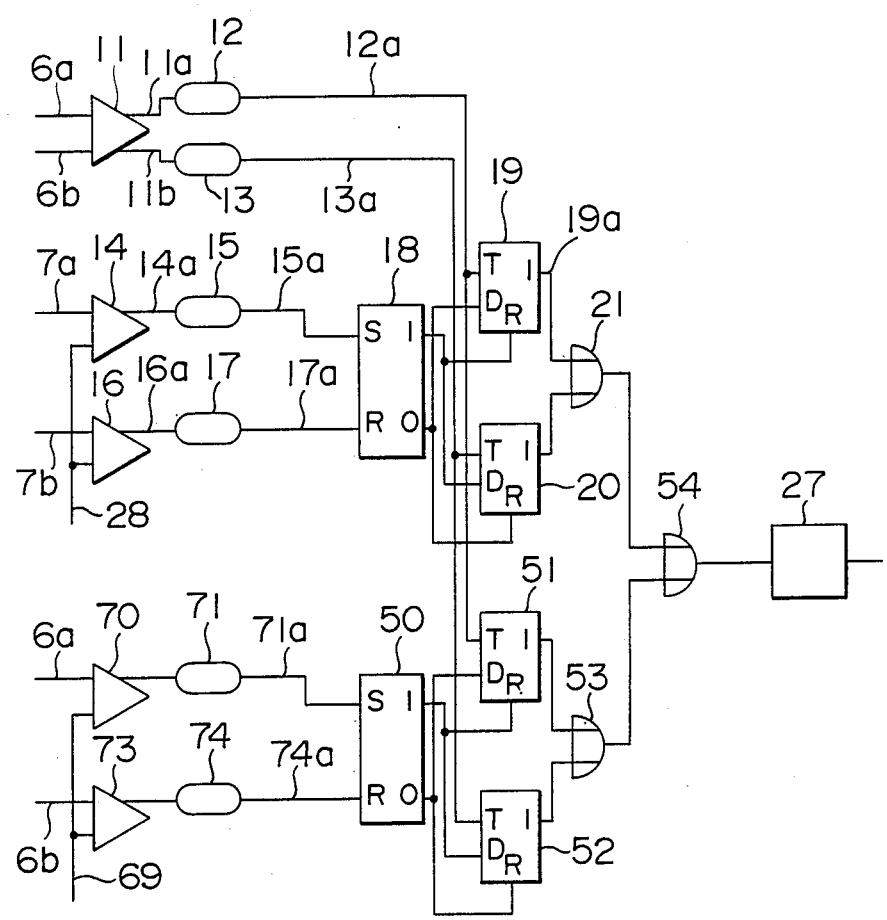
FIG. 6 is a circuit diagram showing another embodiment of the read pulse generator.

FIG. 6 illustrates a read pulse generator according to a second embodiment of the invention.

The constructions and operations of the second embodiment will be explained below. In the second embodiment, the gate signals 15a and 17a respectively delayed by the delay lines 15 and 17 are applied to a set-reset flip-flop 18. The differentiated gate signals 71a and 74a respectively delayed by the delay lines 71 and 74 are applied to a set-reset flip-flop 50. The output signals of the flip-flops 18 and 50 and the zero-cross pulses 12a and 13a delayed by the delay lines 12 and 13 are applied to D-type flip-flops 19, 20, 51 and 52. The outputs of the flip-flops 19 and 20 are applied to the OR gate 21 and the outputs of the flip-flops 51 and 52 are applied to the OR gate 53. The outputs of the OR gates 21 and 53 are applied to the pulse width setting circuit 27 through an OR gate 54 to thereby determine the pulse width of the ORed outputs of the OR gates 21 and 53.

The operation of the second embodiment is almost same as the operation of the first embodiment and differs therefrom in a following point.

In the first embodiment, the correct pulses are extracted from the zero-cross pulses 12a and 13a after the gate signals 15a and 17a and the differentiated gate signals 71a and 74a are ORed by the OR gates, while in the second embodiment the pulses are extracted from the zero-cross pulses 12a and 13a by using the gate signals 15a and 17a and the differentiated gate signals 71a and 74a and the extracted pulses are ORed thereby obtaining the correct pulses. Thus, in the second embodiment, a read pulse signal 8a which is same as the read pulse signal of the first embodiment can be obtained.

Figure 7:
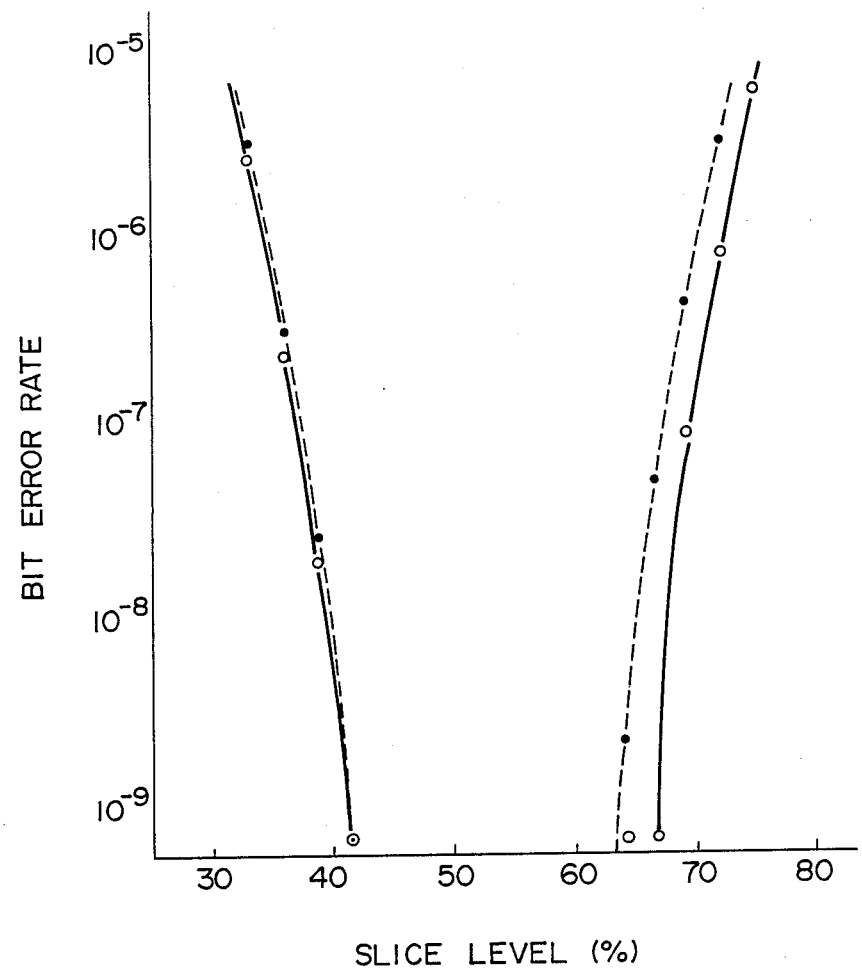
FIG. 7 is a graphical representation useful in comparing the level margin by the prior art with that by the present invention.

The invention described hereinbefore in terms of preferred embodiments can attain effects which can be determined quantitatively as will be described below. Generally, an extent to which the formation of the read pulse signal can be achieved correctly by means of the read pulse generator is indicated by a level margin which defines an extent to which the slice level used for slicing off the gate signal from the non-differentiation signal is allowed to change. Using a measuring instrument, the present inventors actually measured the level margin in connection with the generators according to the prior art and the present invention to obtain results as graphically shown in FIG. 7. In FIG. 7, dotted lines and steady lines show the prior art and the present invention, respectively. Factors determining the lower limit of level margin remain unchanged for both the prior art and this invention and therefore the present invention has substantially the same lower limit as that of the prior art. On the contrary, factors determining the upper limit of level margin are enriched according to the present invention by getting relief from loss of a bit or correct data portion in a high density recording region, which bit loss is encountered in the prior art, and therefore the present invention has an upper limit which extends over an upper limit of the prior art. This effect of an increased upper limit may be converted into an approximately 3 to 4% increased slice level for a bit error rate of $10^{-9}$. Therefore, it will readily be seen that the level margin of the present invention can extend over that of the prior art to improve correctness of the formation of read pulse signal.

As described above, according to the invention, the read pulse generator can be constructed which can improve correctness of the formation of read pulse signal by changing, partially but significantly, the prior art read pulse generator for use in the read channel for recording, and the production of a highly reliable read channel for magnetic recording can be ensured.

What is claimed is:

1. A read channel for magnetic recording comprising:
   a magnetic head for reproduction of information recorded on a magnetic recording medium;

a read pulse generator responsive to a reproduction signal from said magnetic head and a differentiated signal of said reproduction signal to produce a read pulse signal, said read pulse generator including a first limiter circuit for generating a first gate signal from said reproduction signal, a second limiter circuit for generating a second gate signal from said differentiated signal, delay means for delaying said second gate signal relative to said first gate signal by a predetermined time delay and an OR circuit for ORing said first gate signal and said delayed second gate signal; and an output circuit responsive to said read pulse signal to produce a read data signal representative of the information.

2. A read channel for magentic recording according to claim 1 wherein said read pulse generator comprises means for delaying said second gate signal relative to said first gate signal by a predetermined time delay.

3. A read channel for magnetic recording according to claim 1 wherein said predetermined time delay is approximately ¼ (1/fw), where fw is the maximum recording frequency for information to be recorded on the magnetic recording medium and (1/fw) is the maximum time for a data portion to be recorded on the magnetic recording medium.

4. A read channel for magnetic recording comprising:
a magnetic head for reproduction of information recorded on a magnetic recording medium;
a read pulse generator responsive to a reproduction signal from said magnetic head and a differentiated signal of said reproduction signal to produce a read pulse signal, said read pulse generator including a first limiter circuit for generating a first gate signal from said reproduction signal, a second limiter circuit for generating a second gate signal from said differentiated signal, a third limiter circuit for generating a zero-cross pulse from said differentiated signal, a first logical circuit for delivering only a zero-cross pulse generated during the delivery of said first gate signal, a second logical circuit for delivering only a zero-cross pulse generated during the delivery of said second gate signal, and an OR circuit for ORing the output signals of said first and second logical circuits; and an output circuit responsive to said read pulse signal to produce a read data signal representative of the information.

5. A read channel for magnetic recording according to claim 4 wherein said read pulse generator comprises means for delaying said second gate signal relative to said first gate signal by a predetermined time delay.

6. A read channel for magnetic recording according to claim 5 wherein said predetermined time delay is approximately ¼ (1/fw), where fw is the maximum recording frequency for the information to be recorded on the recorded medium and (1/fw) is the maximum time for a data portion to be recorded on the magnetic recording medium.

7. A read pulse generator for use in a read channel for magentic recording comprising:
a first limiter circuit for generating a first gate signal from a reproduction signal waveform produced from a magnetic head;
a second limiter circuit for generating a second gate signal from a differentiated signal waveform of said reproduction signal;
delay means for delaying said second gate signal relative to said first gate signal by a predetermined time delay; and
an OR circuit for ORing said first gate signal and said delayed second gate signal.

* * * * *